United States Patent
Marinier (10) Patent No.: US 8,184,532 B2
(45) Date of Patent: May 22, 2012

(54) ESTIMATION OF INTERFERENCE VARIATION CAUSED BY THE ADDITION OR DELETION OF A CONNECTION

(75) Inventor: Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 708 days.

(21) Appl. No.: 12/286,985

(22) Filed: Oct. 2, 2008

(65) Prior Publication Data

US 2009/0041002 A1    Feb. 12, 2009

Related U.S. Application Data

(63) Continuation of application No. 10/750,130, filed on Dec. 31, 2003, now Pat. No. 7,433,310.

(60) Provisional application No. 60/453,894, filed on Mar. 12, 2003.

(51) Int. Cl.
    *H04L 12/26* (2006.01)
(52) U.S. Cl. ........ 370/230; 370/332; 370/337; 370/347; 455/436
(58) Field of Classification Search .............. 370/230, 370/232, 331, 332, 333; 455/436, 437, 438
    See application file for complete search history.

(56) References Cited

U.S. PATENT DOCUMENTS

| | | | |
|---|---|---|---|
| 5,710,974 A * | 1/1998 | Granlund et al. | 455/436 |
| 6,088,335 A | 7/2000 | I et al. | |
| 6,317,600 B1 | 11/2001 | Salonaho et al. | |
| 6,363,252 B1 * | 3/2002 | Hamalainen et al. | 455/436 |
| 6,760,303 B1 * | 7/2004 | Brouwer | 370/229 |
| 6,850,500 B2 | 2/2005 | Zeira et al. | |
| 7,103,364 B2 * | 9/2006 | Ishikawa et al. | 455/453 |
| 2002/0151310 A1 | 10/2002 | Chung et al. | |
| 2004/0185868 A1 * | 9/2004 | Jain et al. | 455/453 |

FOREIGN PATENT DOCUMENTS

| | | |
|---|---|---|
| WO | 98/21499 | 5/1998 |
| WO | 00/51390 | 8/2000 |

OTHER PUBLICATIONS

Holma et al., "WCDMA for UMTS: Radio Access for Third Generation Mobile Communications", John Wiley & Sons, $3^{rd}$ Edition, Jul. 2004, pp. 210-217.
3GPP TS 25.225 v4.5.0, "3GPP TSG RAN, Physical Layer—Measurements (TDD) Release 4", Sep. 2002.

* cited by examiner

*Primary Examiner* — Marsha D Banks Harold
*Assistant Examiner* — Bo Hui A Zhu
(74) *Attorney, Agent, or Firm* — Volpe and Koenig, P.C.

(57) ABSTRACT

A method for determining whether a connection event between a base station and a wireless transmit/receive unit (WTRU) should be accepted or rejected, comprises measuring the interference level $I_0$ in a candidate timeslot; measuring the path loss L between the base station and the WTRU; measuring the total transmit power $P_0$ of the base station; determining a thermal noise level θ; determining a fading average signal-to-interference ratio (SIR); and calculating a ratio R, wherein if the ratio R is above a certain threshold the connection event will be accepted and if the call is below the threshold it will be rejected.

6 Claims, 6 Drawing Sheets

ESTIMATION OF INTERFERENCE VARIATION CAUSED BY THE ADDITION OR DELETION OF A CONNECTION

CROSS REFERENCE TO RELATED APPLICATION

This application claims priority from U.S. application Ser. No. 10/750,130, filed Dec. 31, 2003, which claims benefit of U.S. Provisional Application Ser. No. 60/453,894 filed on Mar. 12, 2003, which is incorporated by reference as if fully set forth.

FIELD OF INVENTION

The present invention is generally related to wireless communication systems. More particularly, the present invention relates to employing calculations for estimating the interference variation resulting from the addition or deletion of a connection in a wireless communication system. The invention has particular advantages in slotted communications systems, but is not limited thereto.

BACKGROUND

In a radio resource manager (RRM) of a power-controlled wireless communication system, there are advantages to being able to accurately predict the increase in interference resulting from the addition of a connection to the system. The term "connection" denotes an association between a wireless transmit/receive unit (WTRU) and a base station, whereby the WTRU transmits information to be received by the base station (uplink connection), or the base station transmits information to be received by the WTRU (downlink connection). A WTRU may be connected or disconnected from a communication link with the base station, or for that matter, with the network. The addition or deletion of a connection between a WTRU and a base station is a "connection event". The WTRU can have one or several connections at a single time.

The capability of predicting the increase of interference permits the system to make more accurate decisions regarding whether or not the connection should be allowed, and what resources should be allocated to it. This is typically referred to as call admission control or, when choosing the time slots where the physical channels of a user should be allocated, is referred to as fast dynamic resource allocation. Also of interest to some algorithms is the prediction of the decrease of interference following the departure of a connection, or the de-allocation of the physical channels of a user from a time slot.

In a wireless system employing power control, the transmission power of each connection is dynamically adjusted in such a way that the quality of service criterion, such as the block error rate (BLER) or the signal-to-interference ratio (SIR), is just met. The use of power control generally increases the capacity of the system because it minimizes the transmission power of each connection and thus, the interference it causes to other users.

To illustrate the relevance of estimating beforehand the increase of interference following the addition of a connection to the system, consider the following scenario. A given WTRU, such as WTRU A, requests a new downlink connection to the system. After the system grants this new connection, the base station serving WTRU A commences transmission, requiring a certain amount of additional power. This additional transmitted power results in additional interference to other WTRUs, such as WTRU B and WTRU C, already connected to the system and served by the same or other base stations. As a result of this additional interference, the base station(s) serving WTRUs B and C must increase their transmission powers so that the downlink connections to WTRUs B and C maintain their SIR to the required value. This in turn results in additional interference to WTRU A, with a consequent increase of transmission power by the base station serving WTRU A.

The cycle continues until one of the following two possibilities happen: 1) the transmission power and interference levels converge and stabilize to values such that the minimum SIR of all served WTRUs can be achieved; or 2) the transmission power and interference levels constantly increase until the maximum transmission power of the base stations is reached, and the minimum SIR of the served WTRUs is no longer achieved. This latter possibility is of course undesirable and could be avoided if the system had the ability to estimate the resulting increase of interference before the acceptance of a new connection. Although the scenario described applies to the downlink (i.e. a base station-to-WTRU connection), a similar scenario exists for the uplink (i.e. WTRU-to-base station connection).

One estimation technique for a Frequency Division Duplex (FDD) system using Code Division Multiple Access (CDMA) estimates the increase in uplink interference. This technique applies to an FDD/CDMA system where a user connected to a given cell sustains significant interference from other users connected to that cell, (i.e. intra-cell interference). The technique is based on first estimating the "load factor" of a candidate user based on the anticipated required SIR of the user, and to use this load factor along with the load factor of the candidate serving cell to estimate the interference increase.

The technique of estimating the load factor does not apply well to systems where intra-cell interference is negligible compared to interference coming from other cells, (i.e. inter-cell interference). One example would be a system based on one of the TDD modes (1.28 Mcps or 3.84 Mcps) of the UTRA standard. In such a system, base stations as well as WTRUs are equipped with a multi-user detector which has the ability to significantly reduce the interference coming from users connected to the same cell.

Elimination of intra-cell interference is theoretically possible in FDD/CDMA systems as well, but is generally not implemented in current systems due to its complexity. In systems where intra-cell interference is negligible, a possible technique is to base the interference rise or fall estimation on several input parameters, including measurements reported by the user and/or the cell to which it is connected. Such an approach is classified as "measurement-based".

The currently favored specific approach to interference rise estimation is the use of look-up tables. It consists of using the following input elements: 1) expected required SIR of the connection for the user to sustain adequate quality of service; 2) path loss to the serving or potentially serving base station; and 3) level of inter-cell interference including thermal noise, (in the concerned time slots if time-slotted). The concerned time slots are, in the case of a connection addition, the candidate time slots where the connection can potentially be supported. In case of a connection deletion, the concerned time slots are the time slots currently supporting the connection.

This information is used in conjunction with look-up tables. There are two sets of tables, one set for connection addition ("noise rise tables") and one set for connection deletion ("noise fall tables"). The noise rise/fall look-up tables are pre-stored in the radio network controller (RNC). The look-up tables are pre-calculated for the specific deployment scenario in which the system is operating. A deployment scenario is defined in terms of cell radius, propagation environment, base station antenna properties, etc. The look-up tables take the three above-mentioned input elements and return a single value of the estimated increase or decrease of interference in dB. However, the generation of look-up tables for a specific deployment scenario is a non-trivial task involving simulations or measurement collecting, as well as sophisticated statistical analysis.

The prior art schemes for estimating interference rise have certain disadvantages. This is significant with regard to CDMA/FDD systems, in which the load factor of a candidate user is estimated based on the anticipated required SIR. The user intra-cell interference in such estimations is not negligible. The method and formulas used to estimate the load factor in a CDMA/FDD system cannot be effectively applied to a TDD system.

As applied to CDMA/TDD systems, where intra-cell interference is negligible due to the presence of multi-user detection, the use of look-up tables is simple in concept but difficult to implement. First, it is particularly difficult to obtain tables that are suitable for every possible deployment scenario. If tables are obtained from statistical analysis of system level simulation results, a separate analysis must be performed for each possible deployment (e.g., indoor, micro-cellular, urban macro). In each case the results are dependent on several factors such as the path loss propagation model, the noise figure of the various devices and the number of cells in the system. It is unlikely that a given table will provide accurate predictions with an acceptable performance in all deployment situations. Additionally, even if the system is deployed in the same general type of environment as what was simulated, differences between the simulated deployment and the actual deployment are likely to be sufficient to bias the predictions.

Second, from a practical aspect, the process of building a table with a tri-dimensional input and thereafter implementing the table in a simulation tool is a complex, error-prone task.

Accordingly, it would be desirable to have a system and method which efficiently and accurately estimates the effect of an addition or deletion of a connection in a power-controlled wireless system.

SUMMARY

In accordance with one embodiment of the present invention, estimation of the increase or decrease of interference perceived by a user after the establishment of a connection is made prior to the establishment of the connection. The interference increase or decrease is estimated using a simple analytical process, easily adaptable to various deployment scenarios. It is assumed that users served by a same cell incur negligible interference to each other, and that the system employs power control.

According to one aspect of the present invention, a Radio Network Controller (RNC) calculates, prior to the establishment of a connection, an increase of interference perceived by the user after the connection utilizing among other variables, a particular parameter characterizing the deployment scenario.

DETAILED DESCRIPTION OF THE PREFERRED EMBODIMENT(S)

The present invention will be described with reference to the drawing figures where like numerals represent like elements throughout.

By way of introduction, the terminology "wireless transmit/receive unit" (WTRU) as used hereinafter includes, but is not limited to a user equipment, mobile station, fixed or mobile subscriber unit, pager, or any other type client device capable of operating in any type of wireless environment. Exemplary types of wireless environments include, but are not limited to, wireless networks, wireless local area networks (LANs) and public LAN mobile networks. The WTRUs described herein are preferably capable of operating in both a time-slotted mode and a frequency-divided mode such as TDD and FDD, respectively. When referred to hereinafter, the terminology "base station" includes, but is not limited to, a Node B, site controller, access point, or any other type of interfacing device in a wireless environment.

The present invention permits estimation of the interference increase or decrease based on the following input elements:

a) The level of thermal noise ($\theta$). This is observed at the receiver input; whether at the base station for the uplink (UL) or the WTRU for the downlink (DL). This level is typically calculated using the formula $\theta = k_b * T * B * F$, where $k_b$ is the Boltzmann constant, T is the temperature in Kelvin, B is the bandwidth of the receiver and F is its noise figure.

b) The fading-averaged path loss (L). This includes all antenna gains between the WTRU and its serving base station or candidate serving base station. By "fading-averaged" it is meant that the path loss should be measured and averaged over a period of time long enough to eliminate short-term fluctuations due to fast fading. In the case of a connection deletion, this input element may not be necessary if the transmission power (Pc), (which will be explained in greater detail hereinafter), is available.

c) The fading-averaged interference level including thermal noise ($I_0$) in the time slot or candidate time slot used by the connection. In case of a UTRA TDD system, this is the interference signal code power (ISCP).

d) The fading-averaged signal-to-interference ratio (SIR) at the receiver antenna connector required for maintaining acceptable quality for the connection. In the case of a connection deletion, this input element may not be necessary if the transmission power (Pc) is available.

e) An optional parameter ($G_c$) depending on the system deployment scenario. A deployment scenario is defined in terms of the placement of base stations, the type of environment in which the base stations are deployed, the patterns of the antennas used by the base stations, etc. The parameter $G_c$ is the same for all WTRUs of the system.

f) The sum ($P_0$) of transmission powers of other already existing connections in the serving cell or candidate serving cell and in the time slot or candidate time slot used by the connection. This element is not required. However, if this element is not used, the estimation of increase or decrease of interference is slightly less accurate.

g) In the case of a connection deletion, the transmission power (Pc) of the connection subject to deletion may be known by the system. If this is the case, this element may optionally be used in place of the fading-averaged path loss (L) and the fading-averaged SIR. Similarly, in the case of a connection addition, if another connection with identical characteristics (e.g. data rate and required block error rate) already exists between the WTRU and the base station, the transmission power (Pc) of this connection may be used in place of the fading-averaged path loss (L) and the fading-averaged SIR.

More details will be provided hereinafter regarding how the above elements can be obtained in various example scenarios of interest. Once elements (a) to (e) and optionally (f) are obtained, the ratio (R) between the predicted interference including thermal noise ($I_{pred}$) and the current interference including thermal noise ($I_0$), (i.e. $R=I_{pred}/I_0$), is computed according to Equation (1) in the case of a connection addition:

$$R = \frac{1}{1 - \left(\frac{I_0}{\theta} - 1\right) \frac{L\ SIR}{q + \frac{1}{G_c}}} ; \quad \text{Equation (1)}$$

where q is set to zero (0) when the optional element (f) is not used. All values are in linear units. When the optional element (f) is used, q is set to the ratio ($P_0/I_0$). A negative value for R indicates that the interference would rise until the transmission power levels of the WTRUs (for UL) or base stations (for DL) in the candidate time slot attain their maximum values, while the required SIR would never be achieved. In this situation, the system would become unstable in the candidate time slot, which is an undesirable situation.

In case of a connection deletion, the ratio (R) is computed according to the following:

$$R = \frac{1}{1 + \left(\frac{I_0}{\theta} - 1\right) \frac{L\ SIR}{q + \frac{1}{G_c}}}, \quad \text{Equation (2)}$$

where q is set in the same way as in the case of a connection addition. Estimating the decrease in interference resulting from the deletion of a connection can be useful in various radio resource management scenarios. For example, the system may want to optimize the radio resource utilization of the system by re-allocating some connections from one time slot to another. This task is more accurate if the system can estimate beforehand the decrease of interference in a time slot after the departure of a connection.

In the event of a connection deletion, the transmission power (Pc) of the connection subject to deletion (element g) may be known by the system. If Pc is available, one may (if desired), instead of obtaining SIR and (L) independently, use the following relationship:

$$SIR = \frac{P_c}{L I_0} \quad \text{Equation (3)}$$

Equation 3 implies that the product SIR L can be replaced by the ratio $$\frac{P_c}{I_0}$$

in Equation (2). In other words:

$$R = \frac{1}{1 + \left(\frac{I_0}{\theta} - 1\right) \frac{\frac{P_c}{I_0}}{q + \frac{1}{G_c}}} \quad \text{Equation (4)}$$

In case of a connection addition when another connection with identical characteristics exists between the WTRU and base station, the required SIR of the candidate connection is the same as the SIR of the existing connection. Therefore, following the same reasoning as in the previous paragraph, one may use the following equation in place of Equation (1):

$$R = \frac{1}{1 - \left(\frac{I_0}{\theta} - 1\right) \frac{\frac{P_c}{I_0}}{q + \frac{1}{G_c}}} \quad \text{Equation (5)}$$

where Pc is the transmission power of the existing connection.

In the UTRA system architecture, the estimation of interference increase or decrease should normally take place within an RNC since this is the node where allocation of radio resources takes place. However, it should be noted that the present invention and Equations 1-5 apply to any other wireless system where connections are power-controlled and intra-cell interference is negligible, and the use of the present invention is not constrained to any particular network architecture. Nevertheless, in the following paragraphs, examples of methods of implementing the above-described formulas will be explained in the framework of UTRA TDD systems.

Two scenarios will be considered: 1) estimation of interference increase (decrease) at the WTRU due to the addition (deletion) of a downlink connection; and 2) estimation of interference increase (decrease) at the base station due to the addition (deletion) of an uplink connection. In the following description, where it is indicated that the WTRU reports certain measured values, this means that the WTRU sends measurement reports through a UL channel. The base station forwards the report to the Serving RNC (SRNC) of the WTRU, which then forwards it to the Controlling RNC (CRNC) of the base station serving the WTRU. The CRNC is the node where the estimation of interference increase or decrease is performed. For the sake of brevity this process will not be re-explained in the following paragraphs, and the term RNC will be used generally.

In the context of UTRA TDD, the addition of a connection in a time slot corresponds to the allocation of a physical channel (or a group thereof) in this time slot. Conversely, the deletion of a connection corresponds to the de-allocation of a physical channel.

In the first scenario it is desired to estimate the increase or decrease of interference due to the addition or deletion of a DL connection. The input elements ($\theta$, L, $I_o$, SIR, $G_c$, $P_o$ and $P_c$) to the formula are obtained in the following manner.

The simplest approach to obtain a value for the thermal noise level ($\theta$) of the WTRU is to assume a value based on the typical radio performance of a WTRU. This value is provided by the operator. An alternate approach comprises building a database of levels of thermal noise. The data is obtained on as WTRUs report their ISCP when it is known that there is no significant interference coming from other TDD users.

The fading-averaged path loss (L) is obtained by having the WTRU measure and report the Received Signal Code Power (RSCP) from a beacon channel (such as the primary common control physical channel—PCCPCH) that transmits at a known and constant power. Alternatively, if the WTRU has another connection to the system, it could report its transmission power while the base station reports the power received from this WTRU, and the path loss (L) is then estimated as the difference between the transmitted and received powers.

The fading-averaged interference level ($I_0$) in the candidate time slot is obtained by having the WTRU measure and report the ISCP measured in the candidate time slots.

The fading-averaged SIR of the connection depends on several factors, such as the data rate of the connection, the required block error rate (BLER) and the channel conditions. There are several possible alternative methods to obtain this element.

In a first alternative, the RNC uses a pre-defined table indicating the approximate required average SIR corresponding to a given data rate and BLER. This table is preferably built based on previous reports of SIR recorded by the RNC, or from direct input from the operator based on simulation results. In a second alternative, in case of a connection deletion (or in case of a connection addition if the subject WTRU already has a connection with identical characteristics to the base station), the WTRU reports the SIR of the existing connection.

The parameter ($G_c$), which depends on the system deployment scenario, is preferably a fixed value stored in the RNC that is determined by the operator. This value is set approximately to the typical link gain (inverse of path loss) between a base station and a WTRU operating in a neighboring cell. Increasing the value of $G_c$ results in higher values for the interference increase estimates (higher value for R). Conversely, decreasing the value of $G_c$ results in lower values for the interference increase estimates.

In an initial deployment scenario, it may prove difficult to quickly determine the value of $G_c$ that results in the most accurate interference increase estimation. To refine the estimation process, the system may collect statistics of interference values reported by the WTRUs before and after they are connected, and adjust the value of $G_c$ according to any bias observed between the estimated and actual increase of interference.

For example, if it is seen that the interference increase estimates are consistently below the actual interference increase, the system can raise the value of $G_c$, and conversely if the estimates are consistently above the actual increase, the value of $G_c$ can be lowered.

The optional sum ($P_0$) of transmission powers of other already existing connections in the serving cell is readily obtained in the case of a DL connection, as it corresponds to the base station transmission power before the addition of the connection. This value is preferably reported by the base station to the RNC.

The transmission power (Pc) of the connection, subject to deletion (or, in case of a connection addition, the connection with identical characteristics to the one to be added), is reported by the base station serving the WTRU.

It should be noted that the procedures will be described hereinafter as comprising discrete steps in a particular order. However, those of skill in the art would realize that while some steps necessarily depend upon the occurrence of prior steps, other steps do not require such a succession. Additionally, steps may be combined, split up or reordered without affecting the result of the procedure. Accordingly, the present invention should not be limited to the particular sequence of steps as set forth herein.

Figure 1:
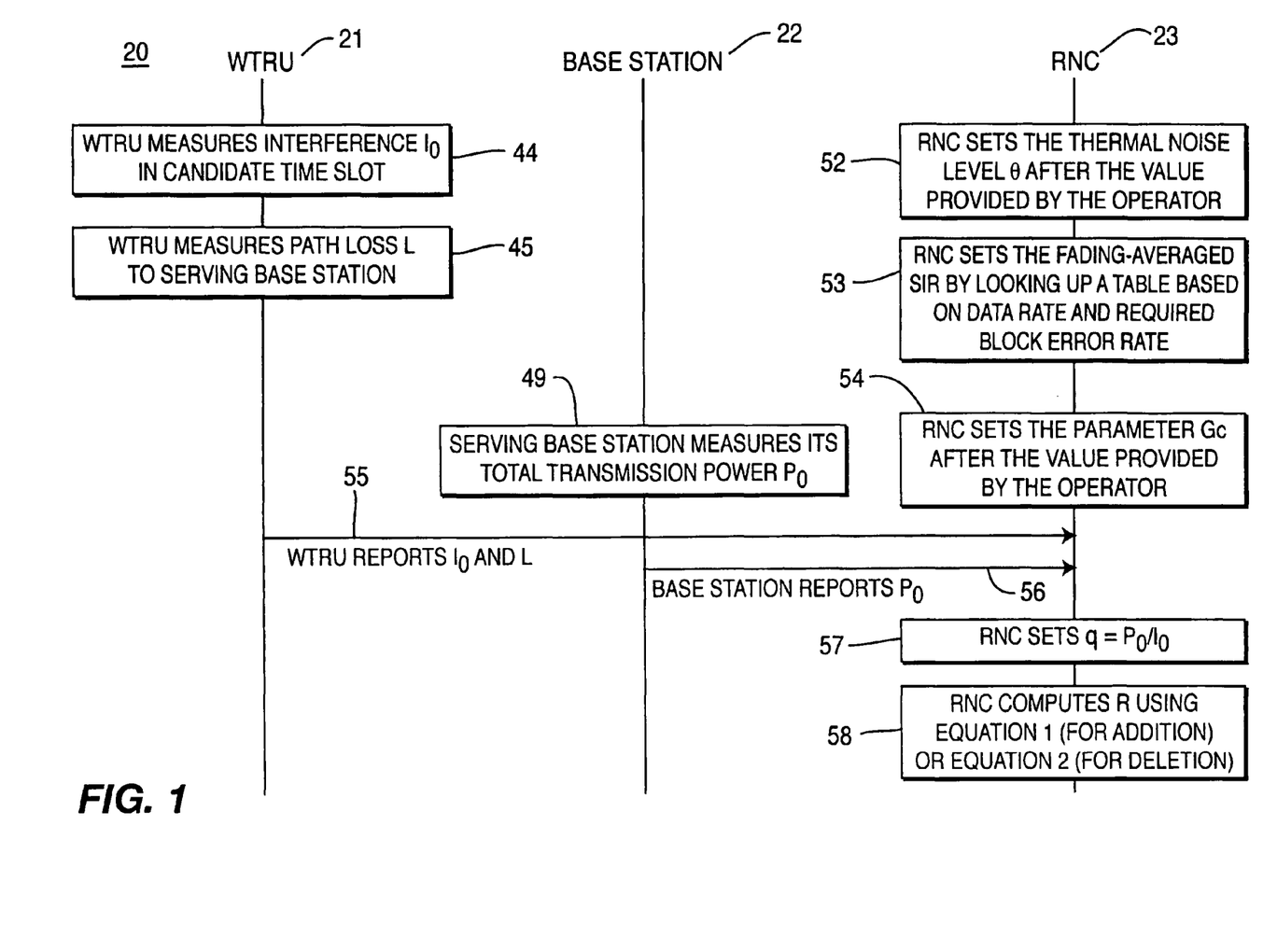
FIG. 1 is a flow diagram of a process of estimating increase or decrease of interference in the downlink when path loss and SIR are used, according to the present invention.
Figure 2:
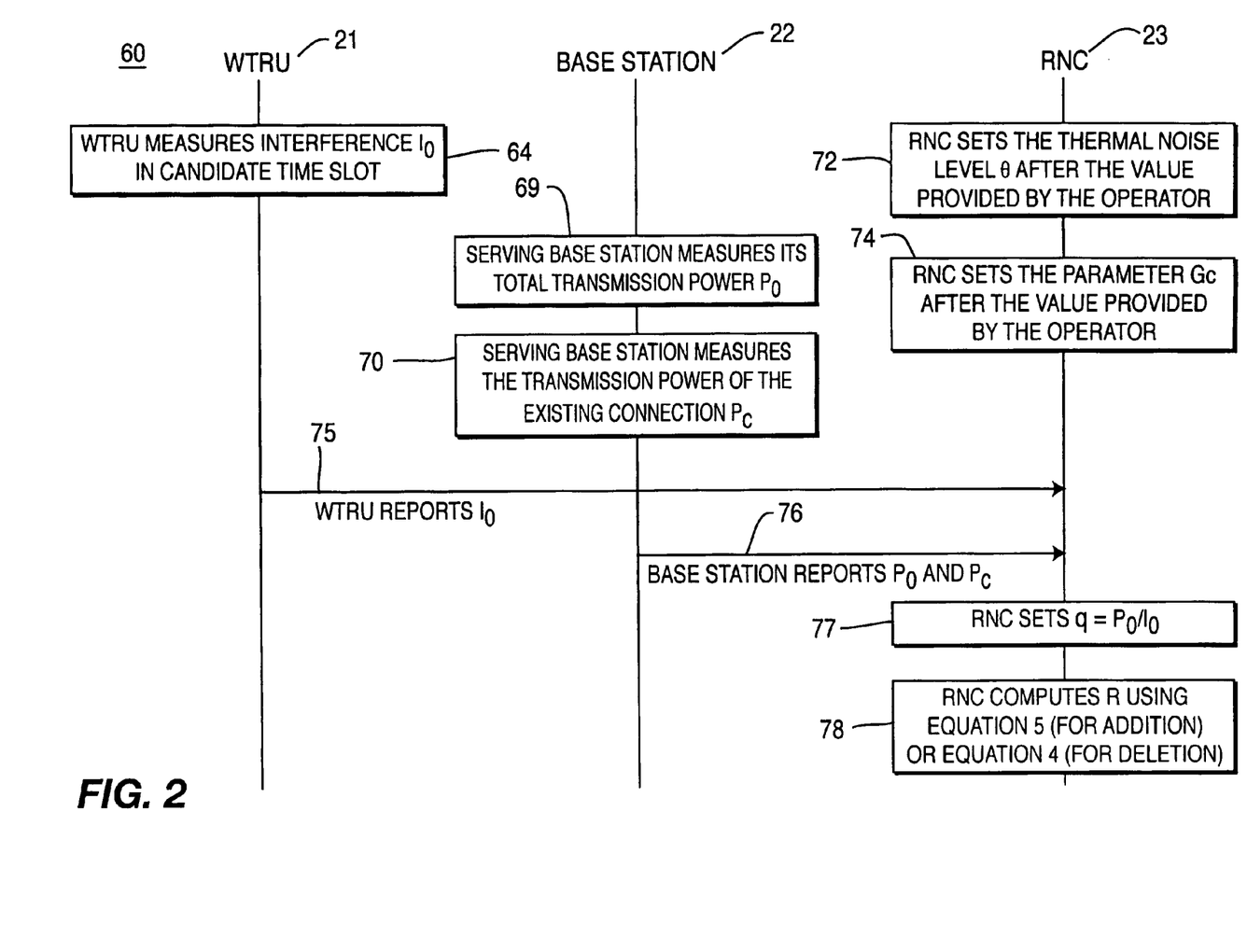
FIG. 2 is a flow diagram of a process of estimating increase or decrease of interference in the downlink when the transmission power is used, according to the present invention.

FIG. 1 shows the procedure 20 for estimating the increase or decrease of interference in the DL when the path loss L and SIR (elements (b) and (d)) are used and the transmission power Pc (element (g)) is not used. FIG. 2 shows the procedure 60 for estimating the increase or decrease of interference in the DL when the path loss L and SIR (elements (b) and (d)) are not used and the transmission power Pc (element (g)) is used. In both illustrated procedures 20, 60 it is assumed that the optional sum of transmission powers of already existing connections in the serving cell ($P_0$) is used. It would be also possible to not use this element and simply set q=0 prior to the computation of R.

Referring to FIG. 1, the procedure 20 is implemented by the WTRU 21, a serving base station 22 and the RNC 23. The WTRU 21 measures interference $I_0$ in a candidate time slot (step 44), and the WTRU 21 measures path loss L to the serving base station 22 (step 45). The serving base station 22 measures its total transmission power $P_0$ (step 49). The RNC 23 sets its thermal noise level $\theta$ from a value provided by the operator (step 52), and the RNC 23 sets a fading-averaged SIR based on a look-up table based on data rate and required BLER (step 53).

The RNC 23 sets the parameter Gc from a value provided by the operator (step 54). The WTRU 21 reports interference $I_0$ and path loss L (step 55), and the base station 22 reports total transmission power $P_0$ (step 56). The RNC 23 sets q to $P_0/I_0$ (step 57). The RNC 23 then computes R using the appropriate equation, (Equation 1 for addition of a WTRU 21 or Equation 2 for deletion of a WTRU 21 (step 58)).

Referring to FIG. 2, the procedure 60 for when transmission power Pc (element (g)) is used is implemented by the WTRU 21, a serving base station 22 and the RNC 23. The WTRU 21 measures interference $I_0$ in a candidate time slot (step 64). The base station 22 measures its total transmission power $P_0$ (step 69). The base station 22 measures the transmission power of the existing connection $P_c$ (step 70). The RNC 23 sets its thermal noise level $\theta$ from a value provided by the operator (step 72), and the RNC 23 sets the parameter Gc from a value provided by the operator (step 74). The WTRU 21 reports interference $I_0$ (step 75) but not path loss L (which is unavailable), and the base station 22 reports total transmission power $P_0$ and the transmission power of the existing connection (step 76). The RNC 23 then sets q to $P_0/I_0$ (step 77) and computes R using the appropriate equation; (Equation 5 for addition of a WTRU 21 or Equation 4 for deletion of a WTRU 21 (step 78)).

In the second scenario, it is desired to estimate the increase or decrease of interference due to the addition or deletion of an UL connection. The input elements ($\theta$, L, $I_o$ SIR, $G_o$, $P_o$, $P_c$) to the formula are obtained in a way generally similar to that of the DL connection, with the following differences:

First, the thermal noise level ($\theta$) is the value for the base station instead of the WTRU.

Second, the fading-averaged interference level ($I_0$) and the fading-averaged SIR are measured at the base station instead of the WTRU. The base station can report these values to the RNC. The approach of using a pre-defined table for the SIR can also be used for the uplink.

Third, the optional transmission powers of other already existing connections in the serving cell ($P_0$) now correspond to the sum of transmission powers of the WTRUs. This information should be available at the controlling RNC (CRNC), provided that the serving RNC (SRNC) periodically forwards the measurements of WTRU transmission powers. If the measurements are not available or not reliable because they had been reported a long time prior to the estimation, then it is preferable to not use this optional element and set q=0 in the formula.

The transmission power (Pc) of the connection subject to deletion, (or in case of a connection addition, the connection with identical characteristics to the one to be added), can be reported by the WTRU.

Figure 3:
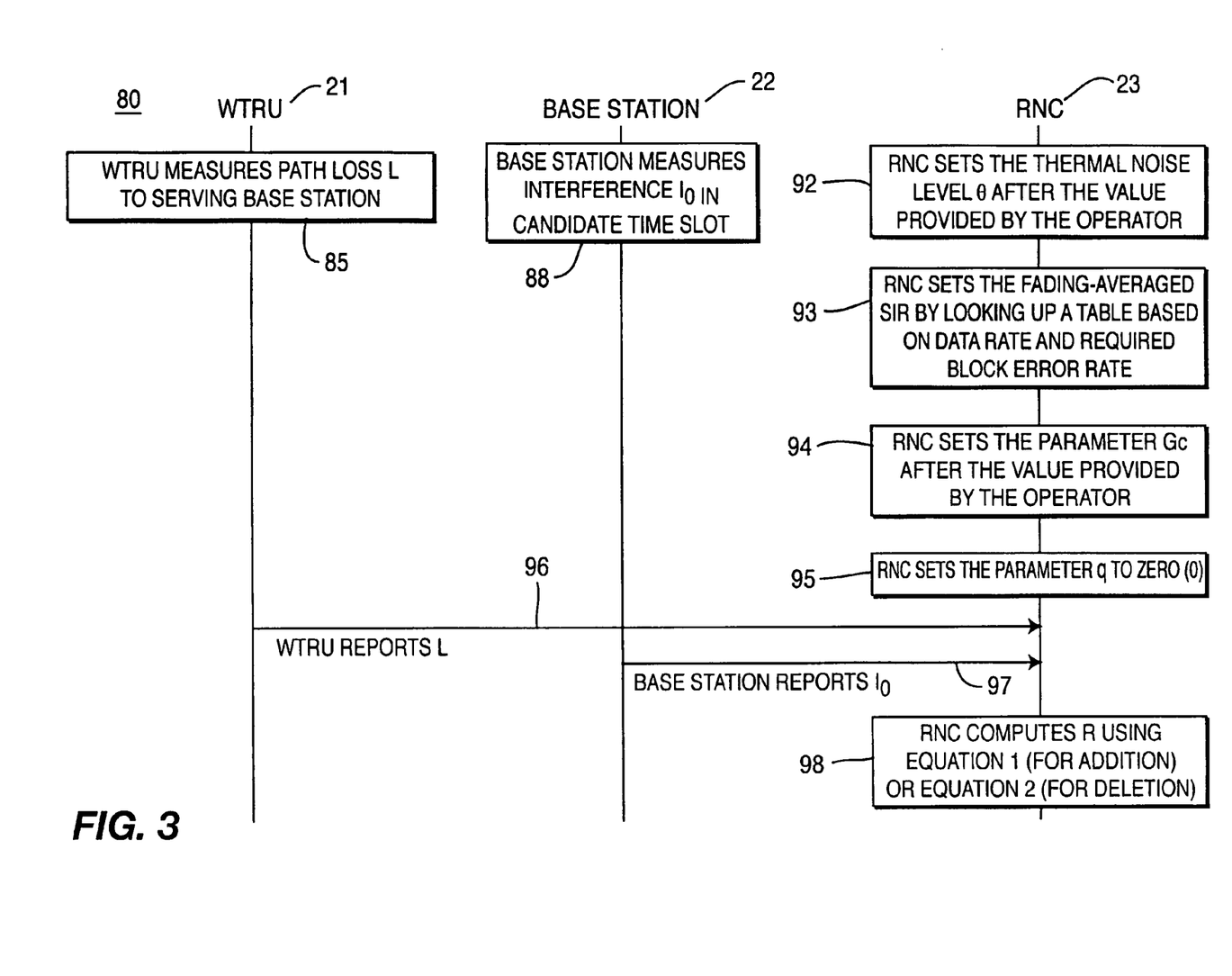
FIG. 3 is a flow diagram of a process of estimating increase or decrease of interference in the uplink when path loss and SIR are used, according to the present invention.
Figure 4:
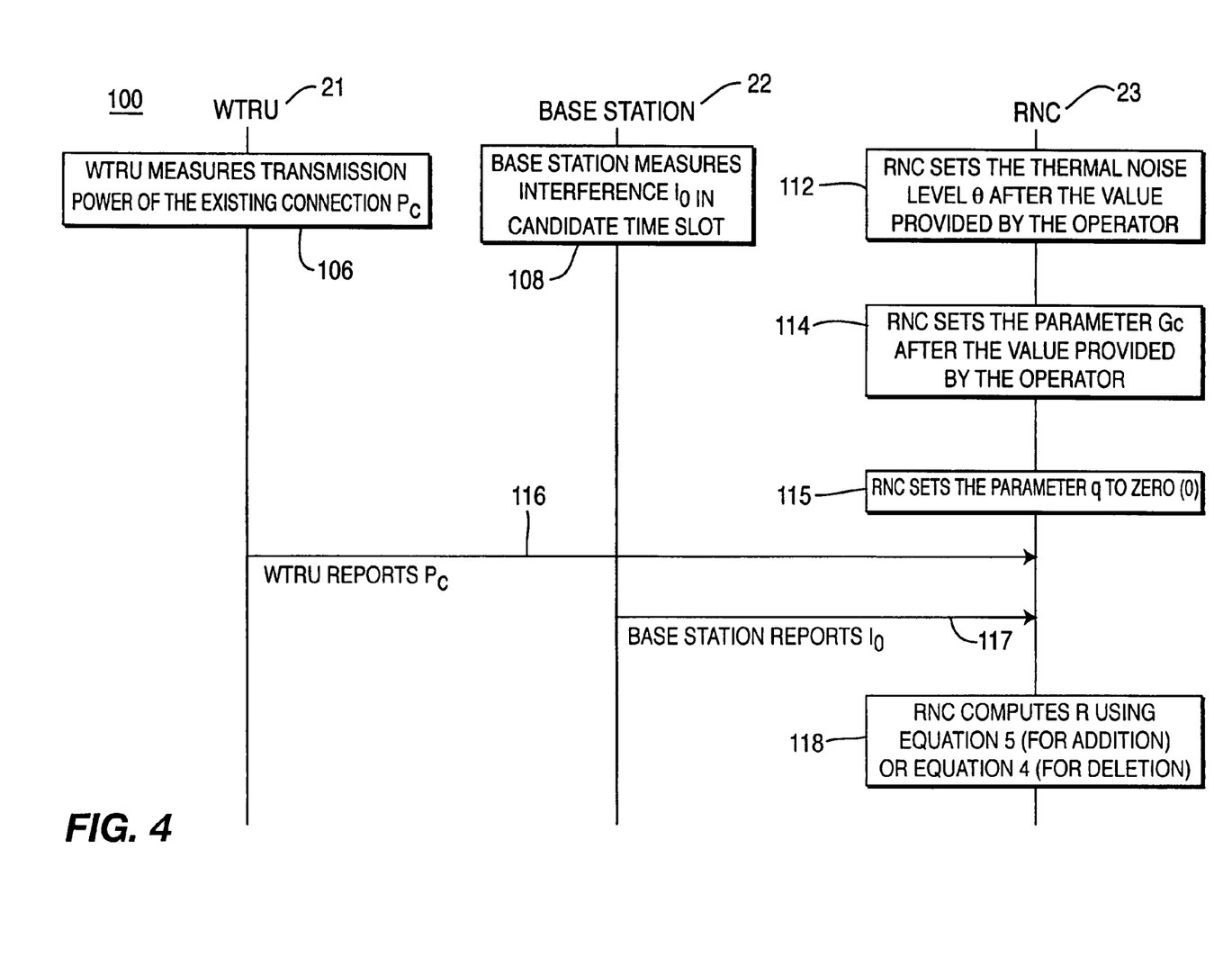
FIG. 4 is a flow diagram of a process of estimating increase or decrease of interference in the uplink when the transmission power is used, according to the present invention.

FIG. 3 shows the procedure 80 for estimating the increase or decrease of interference in the UL when the path loss L and SIR (elements (b) and (d)) are used and the transmission power Pc (element (g)) is not used. FIG. 4 shows the procedure 100, for estimating the increase of decrease of interference in the UL when the path loss L and SIR (elements (b) and (d)) are not used and the transmission power Pc (element (g)) is used.

In both procedures 80, 100, it is assumed that the optional sum of transmission powers of already existing connections in the serving cell ($P_0$) is not used and q is set to zero. This is believed to be the most realistic situation. It would be also be possible that every WTRU connected to the base station reports its transmission power, in which case the RNC could set $P_0$ to the sum of these transmission powers and set $q=P_0/I_0$ prior to the computation of R.

Referring to FIG. 3, the procedure 80 when the path loss L and SIR (elements (b) and (d)) are used and the transmission power Pc (element (g)) is not used is implemented by the WTRU 21, the serving base station 22 and the RNC 23. The WTRU 21 measures path loss L to the base station 22 (step 85). The serving base station 22 measures the interference $I_0$ in the candidate time slot (step 88). The RNC 23 sets its thermal noise level $\theta$ from a value provided by the operator (step 92), and the RNC 23 sets a fading-averaged SIR based on a look-up table based on data rate and required BLER (step 93). The RNC 23 sets the parameter Gc from a value provided by the operator (step 94). The RNC 23 sets the parameter q to zero (step 95). The WTRU 21 reports path loss L (step 96), and the base station 22 reports interference $I_0$ (step 97). The RNC 23 then computes R using the appropriate equation for addition or deletion (Equations 1 and 2, respectively), of a WTRU 21 (step 98). In this procedure 80, the RNC 23 does not set q to $P_0/I_0$.

Referring to FIG. 4, the procedure 100 when the path loss L and SIR (elements (b) and (d)) are not used and the transmission power Pc (element (g)) is used is implemented by the WTRU 21, the serving base station 22 and the RNC 23. The WTRU 21 measures transmission power of the existing connection Pc (step 106). The base station 22 measures interference $I_0$ in the candidate time slot (step 108). The RNC 23 sets its thermal noise level $\theta$ from a value provided by the operator (step 112), and the RNC 23 sets the parameter Gc from a value provided by the operator (step 114). The RNC 23 sets the parameter q to zero (step 115). The WTRU 21 reports transmission power $P_C$ (step 116), and the base station 22 reports interference $I_0$ (step 117). The RNC 23 then computes R using the appropriate equation for addition or deletion (Equations 5 and 4, respectively) of a WTRU 21 (step 118). In this procedure, the RNC 23 does not set q to $P_0/I_0$.

Figure 5:
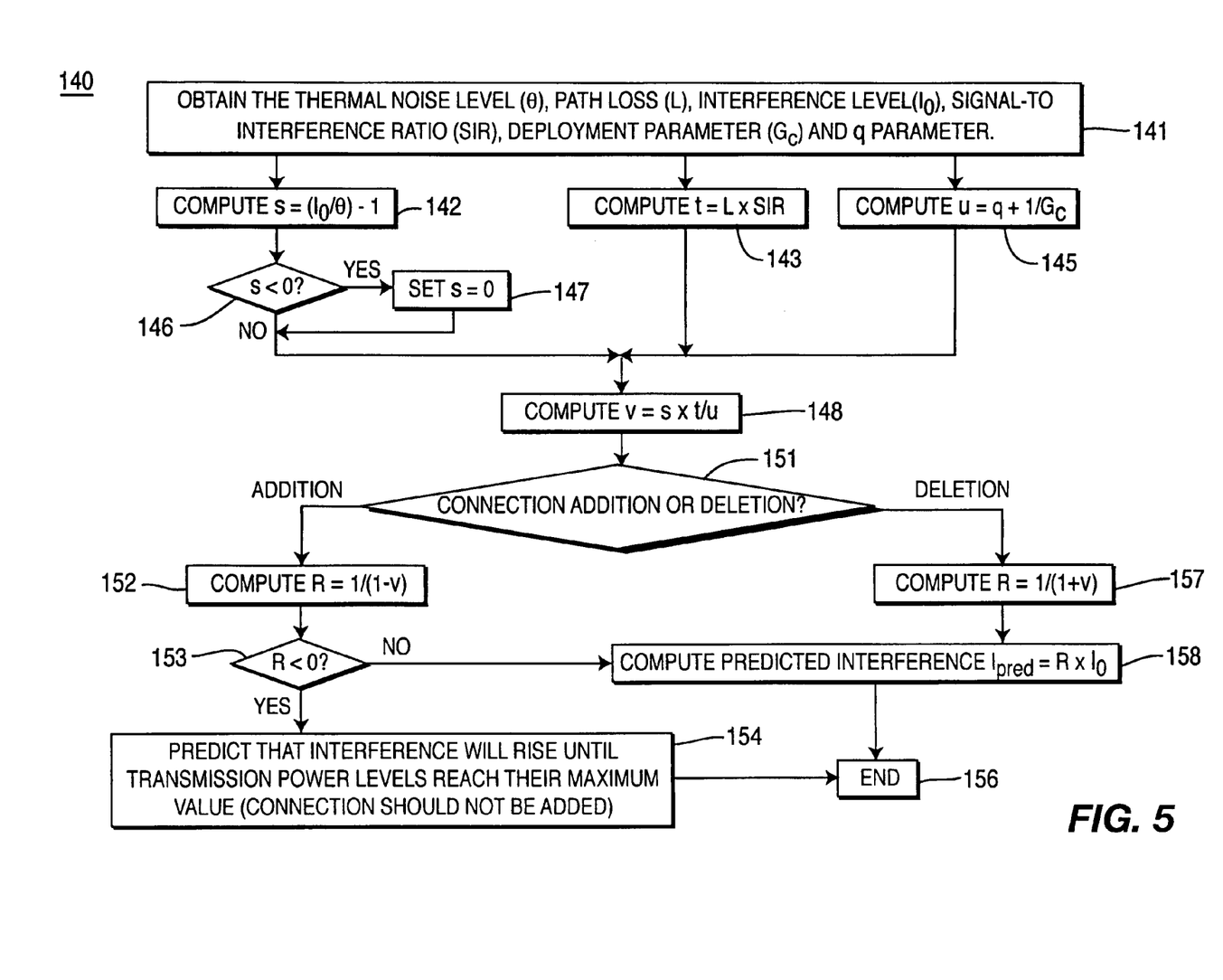
FIG. 5 is a flow diagram of a procedure for calculating the predicted interference in the RNC according to one aspect of the present invention.

FIG. 5 is a flow diagram of a procedure 140 for predicting interference in the RNC in accordance with the present invention. Preferably, the procedure 140 utilizes either of Equations (1) or (2).

At the commencement of the procedure 140, the thermal noise level ($\theta$), path loss (L), interference level ($I_0$), signal-to-interference ratio (SIR), deployment parameter $G_c$ and the parameter (q) are obtained (step 141). Separate computations are made for $s=(I_0/\theta)-1$ (step 142), $t=L\times SIR$ (step 143) and $u=q+1/Gc$ (step 145).

The computation of $s=(I_0/\theta)-1$ is used to determine if $s<0$ (step 146). When computing the variable (s), it is preferable to check that the obtained value is positive. Since the interference level ($I_0$) reported by the WTRU or the base station includes the thermal noise ($\theta$), the interference level ($I_0$) should always be greater than the thermal noise ($\theta$). However, in practice, if the actual interference level $I_0$ experienced by the WTRU or base station is very close to the thermal noise ($\theta$), it is possible that the value reported for the interference level ($I_0$) is smaller than the thermal noise ($\theta$) due to measurement errors by the WTRU or base station, or due to an over-estimation of the thermal noise ($\theta$) by the RNC which could happen if the operator assumed a value too high for the thermal noise ($\theta$) of the WTRU or base station. If this situation occurs, the variable (s) is negative and should be reset to zero ($\theta$) as if the interference level ($I_0$) were equal to the thermal noise ($\theta$) to prevent a logical inconsistency. Accordingly, if $s<0$, then s is assumed equal to 0 and s is set at 0 (step 147). The variables s, t and u are used to compute $v=s\times t/u$ (step 148).

After computing the variable v, a determination is made as to whether the connection is an addition or deletion (step 151). There are two possible calculations for R depending on whether one is in a scenario of connection addition or deletion, (corresponding to Equations 1 or 2 respectively). In the case of an addition, a computation is made of $R=1/(1-v)$ (step 152), and a determination (step 153) is made as to whether $R<0$. If this occurs, this means that it is predicted that following the addition of the connection, the interference level would rise until the transmission power levels (of the base stations or WTRUs) exceed their predetermined maximum value and the connection should be denied (step 154). The estimation is thus complete (step 156).

When R is greater than or equal to zero, the predicted interference level after the addition or deletion of the connection is obtained by multiplying R by the current interference level ($I_0$) (step 158), and the estimation is complete (step 156).

If the connection is a deletion as determined by step 151, a computation is made of $R=1/(1+v)$ (step 157). A computation of predicted interference of $I_{pred}=R\times I_0$ is made (step 158) and the estimation is complete (step 156).

Figure 6:
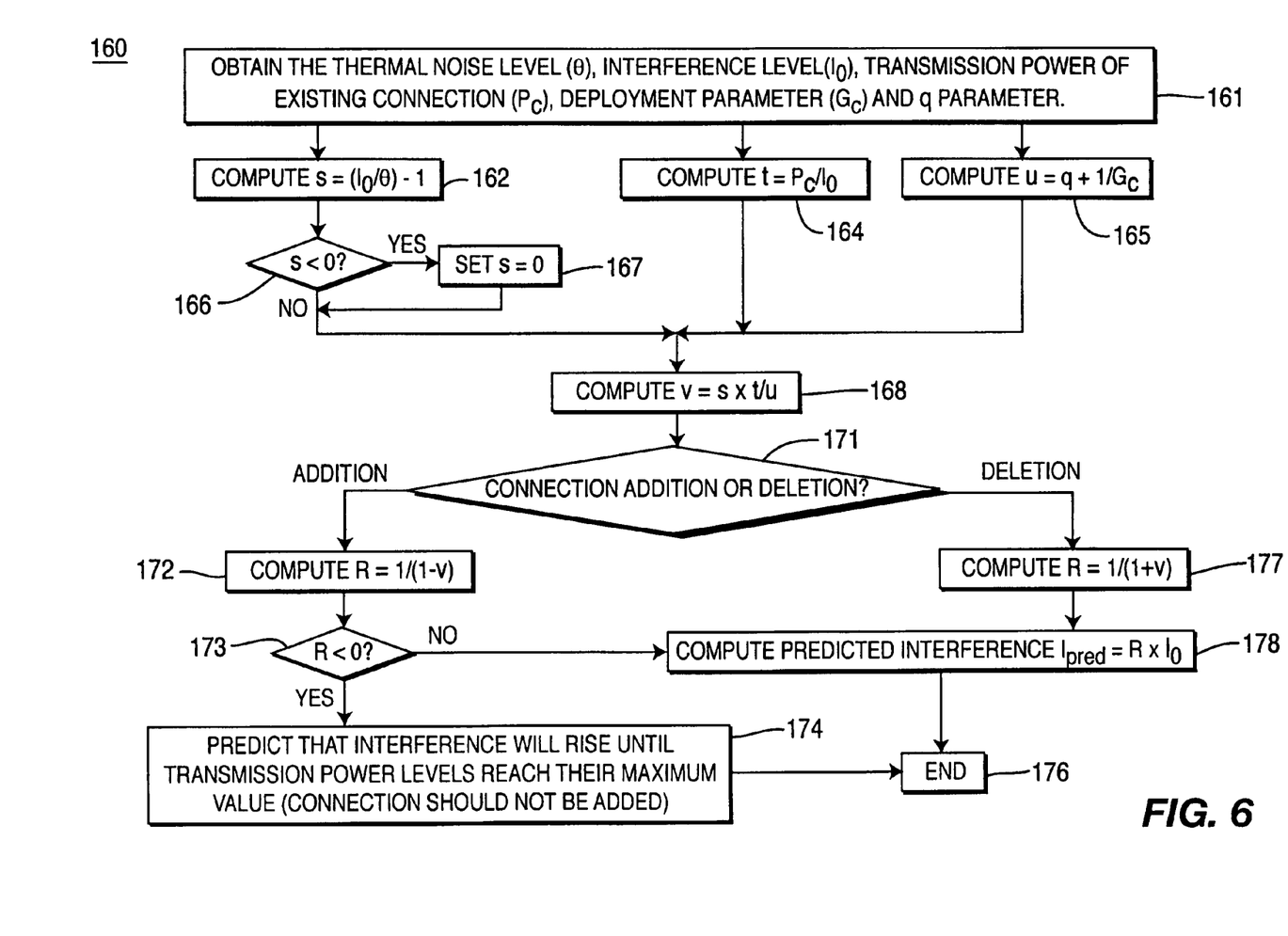
FIG. 6 is a flow diagram of a procedure for calculating the predicted interference in the RNC according to another aspect of the present invention.

FIG. 6 is a flow diagram of a procedure 160 in which path loss (L) and SIR are not available, but transmission power of an existing connection $P_C$ is available. As is the case with FIG. 5, this is one of many possible executions of the invention, using Equations (4) or (5). At the commencement of the procedure 160, the thermal noise level ($\theta$), interference level ($I_0$), transmission power of an existing connection $P_c$, deployment parameter $G_c$ and the parameter (q) are obtained (step 161).

Separate computations are then made for $s=(I_0/\theta)-1$ (step 162), $t=P_c/I_0$ (step 164) and $u=q+1/G_c$ (step 165). The computation of $s=(I_0/\theta)-1$ is used to determine if $s<0$ (step 166). If $s<0$, then s is assumed equal to 0 and s is set at $s=0$ (step 167). The variables s, t and u are used to compute $v=s \times t/u$ (step 168). However, in this procedure 160, the value of t is determined by $t=P_c/I_0$ in step 164.

Steps 168 and 171-178 correspond to steps 148 and 151-158 in FIG. 5. After computing the variable v, a determination is made as to whether the connection is an addition or deletion (step 171). In the case of an addition, a computation is made of $R=1/(1-v)$ (step 172), and a determination (step 173) is made as to whether $R<0$. If $R<0$, a prediction is made that interference will exceed a predetermined maximum value and the connection should be denied (step 174) and the estimation is complete (step 176). If $R \geq 0$, a computation of predicted interference of $I_{pred}=R \times I_0$ is made (step 178) and the estimation is complete (step 176).

If the connection is a deletion as determined by step 171, a computation is made of $R=1/(1+v)$ (step 177). A computation of predicted interference of $I_{pred}=R \times I_0$ is made (step 178) and the estimation is complete (step 176).

This procedure 160 is used when one utilizes the input element of Pc in place of input elements L and SIR as in the procedures 60, 100 described with reference to FIGS. 2 and 4 for the DL and the UL respectively. As shown, the procedure 160 of FIG. 6 is very similar to the procedure 140 of FIG. 5, except that in the second step the intermediary variable (t) is computed differently as $t=P_c/I_o$.

According to the present invention, the dynamic calculation of interference makes it possible to estimate interference change without the use of noise rise/fall look-up table. The avoidance of the noise rise/fall tables is advantageous because the estimation becomes considerably simpler to implement. In accordance with the present invention, estimation of the interference variation is made as a function of the current interference conditions and the characteristics of the connection to be added/deleted in terms of the path loss (L) and the SIR required to maintain the quality of the connection. Instead of having to re-compute and download new tables in the system each time the deployment is changed, (for example, each time the cell radius is changed), it is only necessary to re-adjust a single parameter ($G_c$).

The present invention utilizes several simplifying approximations: a) there is no intra-cell interference (i.e. interference between users connected to a same base station); b) the path loss (between any pair of a base station and WTRU that do not belong to the same cell) is the same throughout the system, and this value is used (corresponding to 1/Gc). These approximations lead to a result which can take the form of Equations 1-5 or other substantially equivalent forms. The ability to take advantage of the simplifying assumptions permits the present invention to avoid the use of noise rise/fall tables.

The preferred embodiments are described in conjunction with the preferred application of the invention for use with voice as well as data using certain types of transmissions according to the Third Generation Partnership Project (3GPP) wideband code division multiple access (W-CDMA) communication system. The 3GPP system is used only as an example and the invention can be applied to other code division multiple access communication systems.

What is claimed is:

1. A radio network controller (RNC) for use in a wireless communication system, the RNC comprising:
 circuitry configured to determine whether a connection with a wireless transmit/receive unit (WTRU) is capable of being added in a candidate time slot, wherein the connection is added on a condition that a ratio R is greater than or equal to zero and R is calculated according to $$R = \frac{1}{1-\left(\frac{I_0}{\theta}-1\right)\frac{L\,SIR}{\left(\frac{P_0}{I_0}\right)+\frac{1}{G_c}}}$$

wherein $P_0$ is determined transmission power;
 wherein $I_0$ is determined interference in the candidate time slot;
 wherein $\theta$ is thermal noise level of a connection to be added or dropped;
 wherein SIR is fading-averaged signal-to-interference ratio;
 wherein Gc is gain link value;
 wherein L is determined path loss.

2. The RNC of claim 1, wherein the circuitry is further configured to determine whether a connection with a WTRU can be dropped in a candidate time slot.

3. The RNC of claim 2, wherein the circuitry is further configured to calculate the predicted interference $I_{pred}=R \times I_0$ after an existing connection is dropped.

4. A radio network controller (RNC) for use in a wireless communication system, the RNC comprising:
 circuitry configured to determine whether a connection with a wireless transmit/receive unit (WTRU) is capable of being added in a candidate time slot, wherein the connection is added on a condition that a ratio R is greater than or equal to zero and R is calculated according to $$R = \frac{1}{1-\left(\frac{I_0}{\theta}-1\right)\frac{\frac{P_c}{I_0}}{q+\frac{1}{G_c}}}$$

wherein $q=P_0/I_0$;
 wherein $P_0$ is determined transmission power;
 wherein Pc is connection transmission power of a connection to be added or dropped;
 wherein $I_0$ is determined interference in the candidate time slot;
 wherein $\theta$ is thermal noise level of a connection to be added or dropped;
 wherein Gc is gain link value.

5. The RNC of claim 4, wherein the circuitry is further configured to determine whether a connection with a WTRU can be dropped in a candidate time slot.

6. The RNC of claim 5, wherein the circuitry is further configured to calculate the predicted interference $I_{pred}=R \times I_0$ after an existing connection is dropped.

* * * * *